350-6.6 SR

XR 3,800,084

SEARCH ROOM

United States Patent [11] 3,800,084

Vrenko [45] Mar. 26, 1974

SUBSTITUTE FOR MISSING XR

[54] SYSTEM FOR SCANNING PLANAR IMAGES WITH COHERENT LIGHT FOR FACSIMILE REPRODUCTION VIA TELEPHONE CONNECTION

[75] Inventor: Erik Vrenko, Ljubljana, Yugoslavia

[73] Assignee: Iskra-Zavod Za Avtomatizacyo V Zdruzenem podjetju, Iskra, Yugoslavia

[22] Filed: July 22, 1971

[21] Appl. No.: 165,290

[30] Foreign Application Priority Data

July 27, 1970 Yugoslavia........................ 1894/70

[52] U.S. Cl................................... 178/7.6, 350/6
[51] Int. Cl............................................. H04n 1/10
[58] Field of Search............ 350/6, 7, 785; 178/7.6, 178/DIG. 27

[56] References Cited

UNITED STATES PATENTS

| | | | |
|---|---|---|---|
| 3,222,453 | 12/1965 | Whitesell et al. | 178/7.6 |
| 1,809,617 | 6/1931 | Wright | 178/DIG. 27 |
| 3,005,916 | 10/1961 | Lentze | 350/7 |
| 3,617,105 | 11/1971 | Konrad | 350/6 |
| 3,676,645 | 7/1972 | Fickenscher et al. | 178/7.6 |

FOREIGN PATENTS OR APPLICATIONS

| | | | |
|---|---|---|---|
| 1,216,396 | 12/1970 | Great Britain | 178/7.6 |
| 153,610 | 6/1938 | Austria | 178/7.6 |
| 735,197 | 11/1932 | France | 350/7 |

*Primary Examiner*—Robert L. Griffin
*Assistant Examiner*—Joseph A. Orsino, Jr.
*Attorney, Agent, or Firm*—Karl F. Ross; Herbert Dubno

[57] ABSTRACT

A facsimile system, designed for the transmission of images by a telephone connection, includes a scanner in which a laser beam is focused upon a planar image and the diffuse reflection thereof is refocused into a secondary beam directed onto a photoelectric transducer generating an output signal. The light spot formed by the beam is swept across the image by an oscillating mirror which is synchronized with a similar mirror in the path of the reflected light in order to make the angle of incidence of the secondary beam upon the transducer independent of the sweep. In order to make the output voltage of the transducer a linear function of image brightness independent of the position of the light spot, a light gate of varying transmissivity is interposed in the path of the reflected radiation; this light gate may be a semitransparent screen of nonuniform transparency or a shield with a gap of nonuniform width. An analogous arrangement at the receiving end reproduces the original image.

6 Claims, 5 Drawing Figures

SYSTEM FOR SCANNING PLANAR IMAGES WITH COHERENT LIGHT FOR FACSIMILE REPRODUCTION VIA TELEPHONE CONNECTION

My present invention relates to a system designed for the facsimile transmission of images by telecommunication, specifically via a telephone connection, from a transmitting station equipped with image-scanning means to a receiving station provided with image-reproducing means.

The general object of my invention is to provide a system of this character in which the image is optically scanned in a flat state, i.e., while being carried on a planar support, with high-fidelity translation of its brightness into a signal voltage to be transmitted to the remote reproducer.

This object is realized, pursuant to my invention, by utilizing at the transmitting station a scanner which comprises a source of coherent light, such as a laser, whose radiation is focused by a first beam-forming objective into a primary beam projecting onto the image a concentrated light spot which is swept across the image, in a succession of strokes, by first movable deflecting means such as an oscillating mirror; upon relative displacement of the image support and the objective in a direction transverse to these strokes, with the aid of a suitable drive mechanism, the light spot successively sweeps across the entire image. Diffuse reflections of the impinging light are picked up by a second beam-forming objective and concentrated into a secondary beam trained upon a photoelectric transducer or detector which generates an electrical output signal varying with the brightness of these reflections, the angle of incidence of the secondary beam upon the transducer being maintained constant with the aid of second movable deflecting means, synchronized with the first, in cascade with the second objective.

According to another important feature of my invention, a light gate is interposed in the light path between the two oscillating mirrors, specifically between the second mirror and the image support, this light gate having an image transmissivity (or opacity) varying in the sweep direction to maintain a substantially invariable relationship between image brightness and output voltage in all positions of the light spot, as more fully described hereinafter.

The invention will be described more in detail with reference to the accompanying drawing, in which:

FIG. 1 shows the basic principle of image scanning;

FIG. 2 schematically shows a system for scanning a flat image;

WORKING PRINCIPLE

Figures 1, 2:
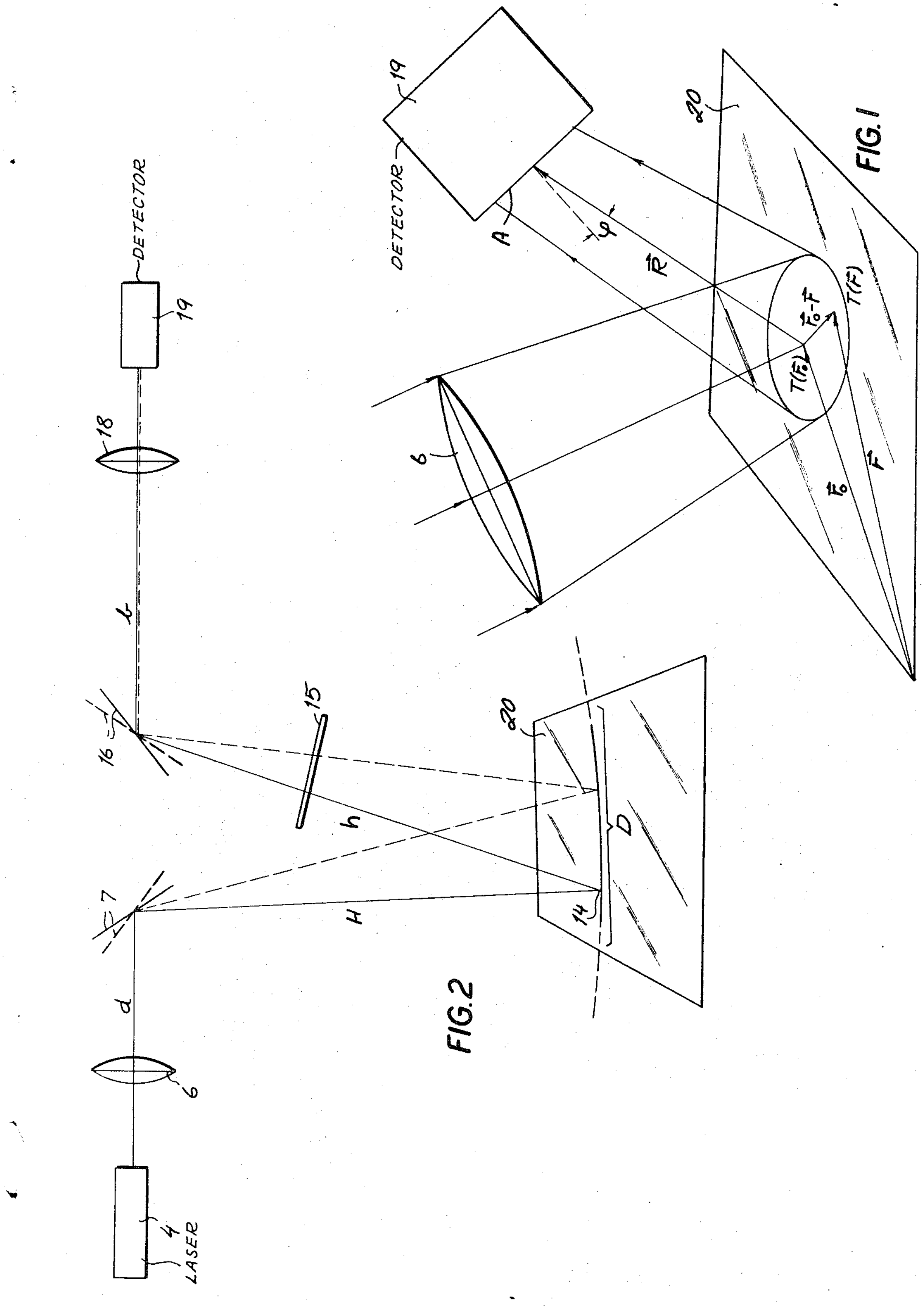

An image can be transmitted by a telephone channel when at any point of the image the albedo or brightness has been measured and its value is transmitted by a proportional voltage to the receiver. The recorder of the receiver should blacken the paper sheet or some other sensitive recording medium, proportionally to the voltage received, at the corresponding points. Hereinafter, the procedure of measuring the albedo at a sequence of points of the image will be referred to as "scanning of the image." The basic principle of scanning will be discussed with reference to FIG. 1. The light beam illuminating the image 20 in the vicinity of the point $T(r_o)$ is focused by the optical system 6. Vector $\vec{r}_o$ extends from the origin of coordinates of the image to the origin of a movable coordinates system in which the distribution of density of the luminous flux in the area of intersection of the beam and the image is described.

Let this distribution be shown by the function $P \cdot j(\vec{r}-\vec{r}_o)$ which states how much energy strikes a surface unit in a unit of time on the image surface in the vicinity of point $T(r_o)$. The coefficient of albedo of the image surface, henceforth designated by $\rho\ (r)$, is a function of the coordinates of the image. When $K(\phi)$ is the voltage sensitivity of the detector, depending on the angle of incidence $\phi$ of the light on the sensitive surface of the detector, the voltage $U$ appearing on the detector illuminated by the diffuse stray light will equal:

$$U=\int_{S_o} K(\varphi)\,\frac{A(r)}{R^2}\,P\cdot j(\vec{r}-\vec{r}_o)\cdot\rho(r)\,dS \qquad (1)$$

$A(r)$ is the sensitive surface of a photoelectric transducer or detector 19 as seen from the point $T(c)$. $R$ is the distance from $T(r_o)$ to the center of the sensitive surface $A$. $S_o$ is the integration range given by the size of the light spot formed at the intersection of the beam with the image, with $dS$ representing an infinitesimal part of area $S$. In writing the above equation, it was assumed that the distance $R$ between the image 20 and the detector 19 is great as compared with the dimensions of the light spot.

When the light source is point-like, the light distribution over the illuminated area is given by the delta function $j(\vec{r}_o-\vec{r})=\rho(\vec{r}-\vec{r}_o)$. Then the integral in equation (1) can be calculated and the proportion is obtained:

$$U = K(\phi)\ [A(r_o)/R^2]\ P\cdot\rho\ (r_o)$$

This expression states that, in general, albedo can be measured over the entire surface of the image only in case of a point-like light source. A point-like light source, however, cannot be realized. Nevertheless, in cases when the albedo $\rho\ (r)$ inside a finite light spot changes sufficiently slowly, the simple expression (2) is still valid. In this case, it is permitted to take $\rho\ (r)$ in equation (1) out of the integral. When, however, $\rho(r)$ inside the light spot changes rapidly, this is no longer allowed. The result of the measurement will be a mean albedo, which is defined by the equation:

$$\bar{\rho}(r_o)=\int_{S_o}\rho(r)\,j(\vec{r}-\vec{r}_o)\,dS \qquad (3)$$

The information regarding the image is blurred in the area $S_o$ in case of a quickly changing brightness $\rho(r)$. It follows that by the size of $S_o$ the resolving power of the system for measuring albedo is determined. As measure for the limit of resolving power the greatest linear dimension of the light spot will be chosen.

By a suitable relative motion of the ray and the image, all points of the image can be scanned. Meanwhile, the detector delivers a time-dependent voltage bearing the information on the image. It is most advantageous to correlate the motions of the beam and the image in such a way that the factor $K(\phi)A(r_o)/R^2$ remains constant during scanning of the image. This can be obtained by numerous different systems. From the point of view of practicability, preference should be given to those systems which permit the image to be flat during scanning and the light spot to be displaced over straight lines. In the following, there will be described the principle of operation of the system according to the present invention including means for scanning a flat image by straight successive lines, which keeps the proportionality factor $K(\phi)A(r_o)/R^2$ equal in each of the scanned points. FIG. 2 shows schematically the structure of this system. The optical lens system 6 focuses the primary light beam from a source of coherent light 4 such as a laser via a movable mirror 7 upon the surface of the image 20. The distance between the mirror 7 and the image 20 is designated by $H$, that between the mirror and the optical system 6 by $d$.

The image 20 advances in a plane tangential to the circle described with a radius $H$ about the axis of rotation of the mirror 7 by the focus 14 of the optical system 6. The direction of the advancing image is perpendicular to the swing plane of the beam incident upon the image. A part of the diffused reflected light from the image strikes the mirror 16 which directs the light through a collecting lens 18 as a secondary beam onto the detector 19. The mirror 16 is also placed on a mechanical deflector for oscillation as indicated in solid and dotted lines. A screen 15 is inserted between the image 20 and the mirror 16 to act as a light gate whose light transmissivity is different at various points. The screen may be a semi-transparent plate of varying opacity or a shield with a gap of varying width. The distance between the image 20 and the mirror 16 is designated by $h$, that between the mirror 16 and the lens 18 by $b$. In the following analysis of this system, the conditions will be shown which must be fulfilled by the arrangement of the elements indicated in FIG. 2 in order that during scanning of the image the relationship between the voltage $U$ at the output of the detector 19 and the albedo $\rho(r)$ at the point scanned be always defined by the same linear function, irrespective of the position of the light spot. For the system shown, equation (2) takes the form:

$$U=\int K(\varphi)\frac{A(r)}{(h+b)^2}\cdot T_z\cdot P\cdot j(r-r_o)\rho(r)dS \quad (4)$$

where $T_z$ is the transmissivity of screen 15 for the light dispersed at the scanned point.

The first condition relates to the resolving power. The area where $\rho = \rho$ should be as small as possible. The limit is given by the resolving power of the image reproducer or by some other criterion. For a given resolving power and with a selected scanning stroke D, as determined by the oscillation or mirror 7, the distance $H$ and the beam diameter at the output lens of the optical system 6 should be made so large that in spite of the arcuate motion of the focus 14 of the beam-forming system 6 the intersection of the beam with the image plane during scanning of the flat image 20 does not exceed the limit of resolving power selected. Distance $H$ is preferably greater than 1 meter. Other conditions result from the requirement that the functional relationship between $U$ and $\rho(r)$ should remain unchanged. It is evident from equation (4) that this condition will be fulfilled if the factor $K(\phi)A(r_o)T_z/(h+b)$ remains the same for every position of the light spot. The components of the system shown in FIG. 2 can is arranged in such a way that this condition be fulfilled. The angular dependence of voltage sensitivity $K(\phi)$ can be eliminated by the mirror 16 whose oscillations are synchronized with the motion of the mirror 7 so that the image of the light spot strikes the lens 18 always at the same angle and therefore also at the same point of the sensitive surface of the detector 19. The factor $A(r_o)/(h+b)^2$ represents the spatial angle relating to the entrance aperture of the lens 18 which varies greatly during scanning of the image. The distance h must be small in order to utilize the greatest possible amount of the dispersed light for measuring. The spatial angle $A(r_o)/(h+b)^2$ itself cannot be kept constant during scanning. To compensate for its variations, I provide the light gate 15 whose transmissivity varies with the point of origin $T$ $(r_o)$ of the dispersed light passes through it. In other words, the transparency of the screen depends on the angle of incidence of the light.

Thus it can be achieved by suitable selection of the screen that the product $A(r_o)T_z/(h+b)^2$ remains constant. This means simply that the detector 19 is to have a constant output during oscillation of mirrors 7 and 16 if the image 20 is of uniform brightness throughout the sweep range $D$. Under these circumstances, therefore, the variations in detector output in the absence of screen 15 are a measure of the required changes in light transmissivity to be introduced by the screen. Thus, distribution of transparency or the profile of the gap on screen 15 can readily be determined experimentally, for each system separately.

Figure 3:
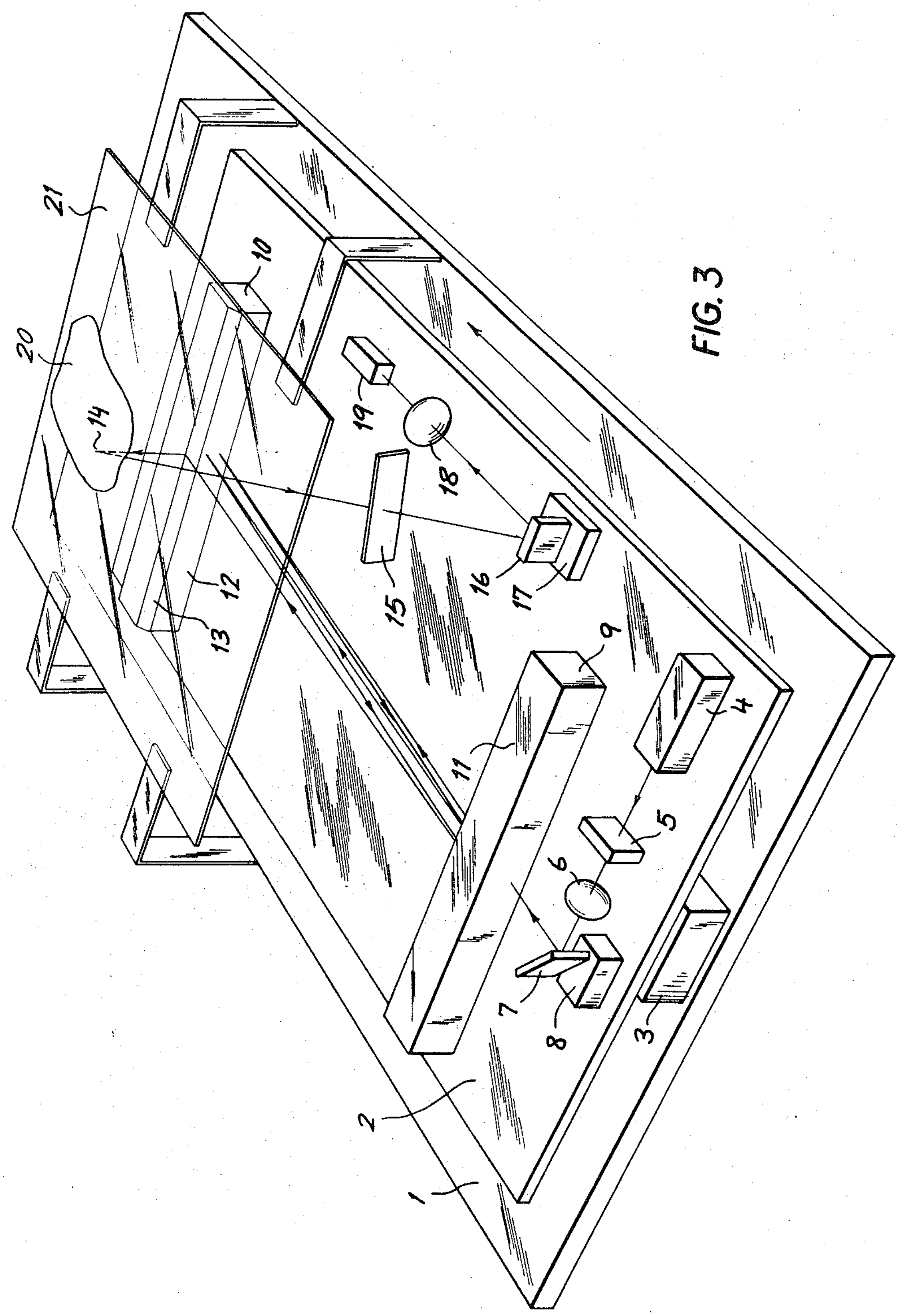
FIG. 3 is a perspective view of a system for scanning or reproduction of an image.

In the following I shall describe a device, working according to the above-disclosed principle and fulfilling all conditions stated, thereby assuring that in scanning flat images by successive straight lines the relationship between $U$ and $\rho r)$ remains always the same linear function. The essential components of the device and their arrangement (except for their electronic parts) are shown schematically in FIG. 3.

All the elements are combined in a case 1 which has no external moving parts. The components of the scanner are situated on a common support 2. These components are: the source of coherent light 4, represented by a laser; beam-forming or focusing systems 6 and 18; deflectors 8 and 17 for the mirrors 7 and 16; reflecting surfaces 11, 12 and 13 produced by vapor deposition on glass prisms 9 and 10. These elements serve for shortening the entire system to usable sizes. The reflecting surface 13 of prism 10 directs the beam after the last deflection perpendicularly to a plane in which the beam moves during repeated reflections between mirrors 11 and 12. The scanned image 20 is laid down on a straight glass plate 21 which is a part of the external case 1. A screen or a semi-transparent plate 15 is provided for the compensation of variations of the spatial angle while a detector 19 measures the intensity of dispersed luminous flux. A drive 3 causes relative motion between the scanning system and the image by moving the supporting plate 2 of the scanner relatively to the case 1.

The scanning proceeds as follows: The optical lens system 6 must be set so that the beam successively striking the mirrors 7, 11, 12, 13 converges into a point lying on the upper surface of the plate 21. The deflector 8 swings the mirror 7 periodically about its axis, thus displacing the focus 14 of the system 6 virtually along a straight line whereby the light beam sweeps across the image 20. The diffusely dispersed light from the image passes through screen 15 and impinges upon the mirror 16 whose motion is synchronized with the motion of the mirror 7 in such a way that the dispersed light strikes the condensing lens 18 of the detector 19 always at the same angle of incidence. Simultaneously, the driving mechanism 3 moves the support 2 within the components of the scanner in a direction parallel to the plate 21 and perpendicular to the direction of motion of the focus 14. When the speed of motion of the scanner is such that during the time of one swap of the light beam across the image the scanner advance by just a diameter of the light spot, then the scan will encompass all points on the image. The detector 19 transmits a time-dependent voltage which bears information about the image. This voltage is transformed by conventional electronic means into a varying voltage suitable for being transmitted by a telephone connection. An equivalent device can transform this latter voltage, received from the scanner, into an image on a photosensitive paper with the aid of an intensity modulator for luminous flux.

The focused beam, which has heretofore served for scanning the image, now is used as a writing "pencil." The intensity modulation for the luminous flux can be obtained by modulating the light beam at 5 or by controlling the output intensity of the light source 4 by means not shown.

Figure 4:
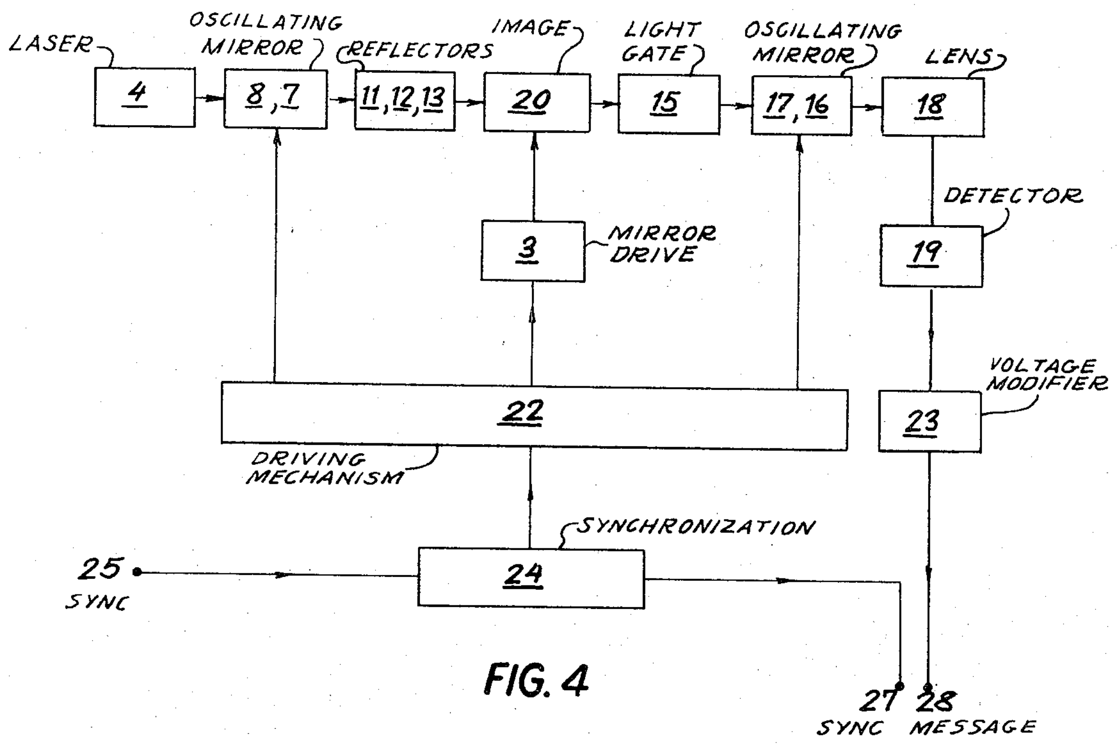
FIG. 4 is a black diagram showing the mechanical and electrical components of the image scanner.
Figure 5:
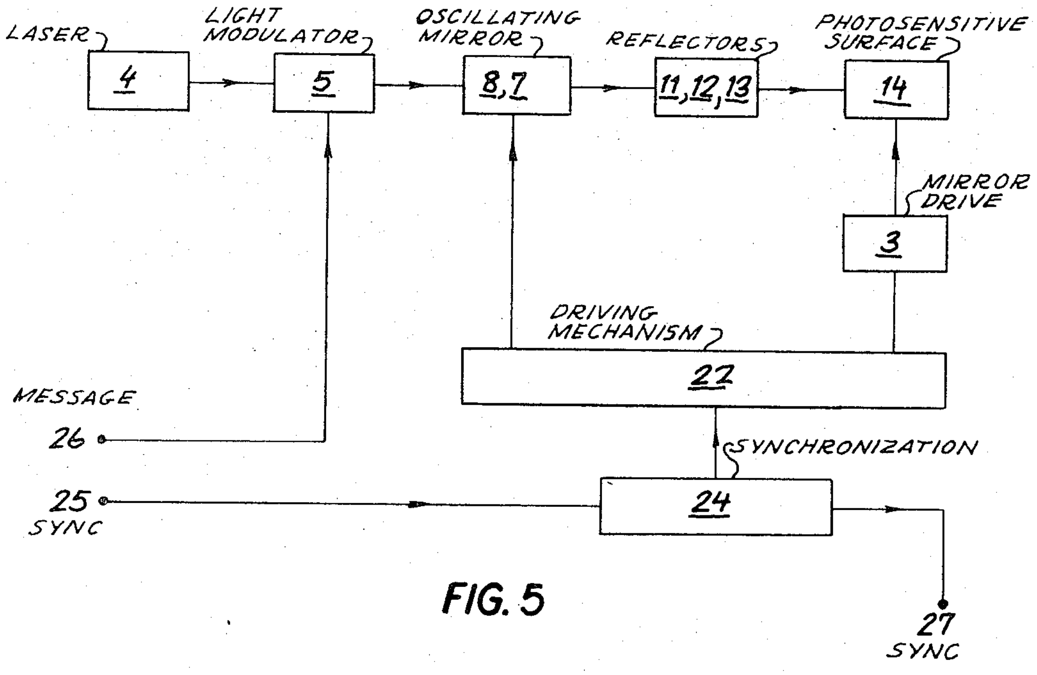
FIG. 5 is a similar block diagram showing the mechanical and electrical components of the image reproducer.

During transmission of the image the scanner and the recorder must have a synchronized beam motion which is obtained by synchronization circuitry 24 shown in FIGS. 4 and 5. This circuitry controls the overall mechanical drive 22 which actuates the two deflectors 8 and 17 and shifts the support 2 with the aid of the mechanism 3. In the scanner at the transmitting station the laser beam after reflection at the mirrors 7, 11, 12 and 13, strikes the image 20. The light, dispersed from the image, passes through the screen 15 onto the mirror 16 and therefrom through lens 18 onto detector 19. The output voltage of the detector is amplified and modified for transmission over a telephone connection by electronic circuitry 23. The output of the recorder transmits thus two kinds of signals: the synchronization signal 27 and the message signal 28 with information about the image. It receives only the synchronization signal 25. The image reproducer or recorder at the receiving station, responsive to the received voltage 26, controls the intensity modulator 5 for the luminous flux of the light source. The modulated beam falls after reflection at mirrors 7, 11, 12 and 13 on the photosensitive paper 14 (FIG. 5) whose position on the transparent plate 21 corresponds to that of the image 20 transmitted by the scanner. The recording at the receiving end transmits the synchronization signal 27 to the scanner. This synchronization voltage and the message signal with image information are not transmitted through two separate channels but pass alternately in consecutive time intervals through one and the same telecommunication channel.

The image transmission over a telephone connection will be undistorted when the motions of both beam, i.e., in the scanning apparatus and in the recording apparatus, are synchronized in a manner known per se.

I claim:

1. In a facsimile system for the transmission of images by telecommunication between a transmitting station provided with image-scanning means and a receiving station provided with image-reproducing means, the improvement wherein said image-scanning means comprises:

a planar support for the image to be scanned;

a source of coherent light;

first beam-forming means focusing light from said source into a primary beam projecting a concentrated light spot onto said image;

first movable deflecting means in the path of said primary beam provided with drive means for sweeping said light spot across said image in a succession of strokes in a plane perpendicular to said support;

mechanism for relatively displacing said support and said first beam-forming means in a direction transverse to said strokes whereby said light spot successively sweeps across the entire image;

second beam-forming means trained upon said image for picking up diffuse reflections from said light spot and concentrating same into a secondary beam;

photoelectric transducer means in the path of said secondary beam for generating an electrical output signal varying with the brightness of said diffuse reflections;

second movable deflecting means in cascade with said second beam-forming means synchronized with said first deflecting means and swingable in said perpendicular plane for maintaining a constant angle of incidence of said secondary beam upon said transducer means; and a light gate in the light path between said first and second deflecting means, said light gate having a light transmissivity varying in the direction of the sweep to maintain a substantially invariable relationship between said brightness and said output signal in all positions of said light spot.

2. The improvement defined in claim 1 wherein said first and second deflecting means are a pair of oscillatable mirrors.

3. The improvement defined in claim 1, further comprising a set of path-lengthening reflectors interposed between said support and said first deflecting means.

4. The improvement defined in claim 1 wherein said image-reproducing means comprises a substantial replica of said support, said source, said first beam-forming means, said first movable deflecting means and said mechanism, said stations being provided with synchronizing circuitry for correlating the motions of said first deflecting means thereat, said image-reproducing means further including modulating means for the light from the source thereof responsive to said output signal whereby the intensity of a beam focused upon a photosensitive recording medium on the associated support varies with the brightness of said image at the transmitting station.

5. The improvement defined in claim 1 wherein said second deflecting means is disposed between said support and said second beam-forming means.

6. The improvement defined in claim 5 wherein said light gate is interposed between said support and said second deflecting means.

* * * * *